United States Patent [19]
Williams et al.

[11] Patent Number: 5,911,065
[45] Date of Patent: Jun. 8, 1999

[54] SYSTEM AND METHOD FOR PROVIDING COOPERATIVE INTERRUPTS IN A PREEMPTIVE TASK SCHEDULING ENVIRONMENT

[75] Inventors: Russell T. Williams; Kelly B. Jacklin, both of San Jose; Jeffrey L. Robbin, Sunnyvale; John J. Iarocci, Santa Clara, all of Calif.

[73] Assignee: Apple Computer, Inc., Cupertino, Calif.

[21] Appl. No.: 08/906,068

[22] Filed: Aug. 5, 1997

Related U.S. Application Data

[63] Continuation of application No. 08/435,736, May 5, 1995, abandoned.

[51] Int. Cl.$^6$ .................................................... G06F 9/00
[52] U.S. Cl. ................................................ 395/677; 395/672
[58] Field of Search ...................................... 395/670, 672, 395/677, 673, 200.33

[56] References Cited

U.S. PATENT DOCUMENTS

| | | | |
|---|---|---|---|
| 5,278,973 | 1/1994 | O'Brien et al. | 395/500 |
| 5,341,478 | 8/1994 | Travis, Jr. et al. | 395/200 |
| 5,515,492 | 5/1996 | Li et al. | 395/155 |
| 5,542,088 | 7/1996 | Jennings, Jr. et al. | 395/650 |

FOREIGN PATENT DOCUMENTS

| | | | |
|---|---|---|---|
| 0 644 484 A2 | 9/1994 | European Pat. Off. | G06F 9/46 |
| 2259794 | 3/1993 | United Kingdom | G06F 9/46 |

OTHER PUBLICATIONS

"Bimodal Applications Without Family Application Program Interface," IBM Technical Disclosure Bulletin, vol. 34, No. 3, Aug. 1991, pp. 404–407, XP000210633.

"Real/IX—A Unique Marraige Between Unix™ and Max 32 Operationg Systems," International Journal of Mini & Microcomputers, vol. 12, No. 2, 1990, pp. 42–53, XP000167976, Hellstrom M., et al.

*Primary Examiner*—Majid A. Banankham
*Attorney, Agent, or Firm*—Fenwick & West LLP

[57] ABSTRACT

A system and method for executing applications written in a cooperative scheduling environment in a preemptive task scheduling environment, ensuring that the time sequence for the delivery of interrupts is not altered in the preemptive task scheduling environment, efficiently disabling all cooperative interrupts in response to a request from an application, efficiently scheduling all cooperative interrupts, and efficiently executing emulated instructions while preserving the integrity of the emulated instructions. The system and method utilize a process server to enforce the cooperative scheduling, a cooperative interrupt server and a holds queue to enforce the interrupt requirements, and special context data to ensure the compatibility of applications designed using an old instruction set architecture.

15 Claims, 7 Drawing Sheets

SYSTEM AND METHOD FOR PROVIDING COOPERATIVE INTERRUPTS IN A PREEMPTIVE TASK SCHEDULING ENVIRONMENT

RELATED APPLICATIONS

This is a continuation of application Ser. No. 08/435,736 filed on May 5, 1995 now abandoned.

BACKGROUND OF THE INVENTION

1. Field of the Invention

This invention relates generally to computer operating systems. More particularly, the invention relates to a system and method for ensuring that a software application designed to operate in a cooperative scheduling environment operates correctly in a preemptive task scheduling environment.

2. Description of Background Art

Designers of operating systems incorporate a wide variety of functions into their design. Process scheduling is one such operating system function. Operating systems define a process scheduling environment. Examples of process scheduling environments include a cooperative scheduling environment and a preemptive task scheduling environment.

In a cooperative scheduling environment, software applications are scheduled cooperatively. That is, once a first cooperative application begins executing, no other cooperative application may execute until either: (1) the first cooperative application explicitly relinquishes control of the central processing unit (CPU); or (2) a cooperative interrupt occurs. An application is a procedure, e.g., a program, that is designed to operate in a cooperative scheduling environment while a task is a procedure designed to operate in any other operating system environment, e.g., the preemptive task scheduling environment.

During execution, applications can initiate asynchronous operations, i.e., operations that will complete at a later time. Examples of asynchronous operations include an input/output (I/O) operation or the setting of a timer. When the asynchronous operation is complete, e.g., the I/O transfer is complete or the specified time has elapsed, a cooperative interrupt is generated. Completion information is sent to the interrupt handling routine associated with the source application, i.e., the application initiating the asynchronous operation. The completion information identifies the associated asynchronous request. The appropriate interrupt handler within the source application, interrupts the current cooperative application (CCA), i.e., the application currently executing. The current cooperative application is interrupted even if it is not the source application. In response to the interrupt, the CPU executes the interrupt completion routine.

After the completion routine has finished executing, the operating system determines if any other cooperative interrupts are pending. If additional cooperative interrupts are pending, these interrupts are serviced, i.e., the appropriate completion routine is executed. When no more cooperative interrupts are pending, the current cooperative application continues execution.

In the cooperative scheduling environment, an application can ensure that it will not be interrupted by disabling all cooperative interrupts. An application may disable the cooperative interrupts if it is executing a function that, for example, must be completed before it can properly service the asynchronous operation. To effectuate this, all applications in the cooperative scheduling environment have the ability to disable all cooperative interrupts.

An example of a cooperative scheduling environment is an Apple System 7 operating system for the Macintosh Computer, commercially available from Apple Computer, Inc., Cupertino, Calif.

A second type of scheduling environment is a preemptive task scheduling environment. Examples of a preemptive task scheduling environment include UNIX System V, developed by AT&T Bell Laboratories, and Windows NT, developed by Microsoft Corporation. In a preemptive task scheduling environment the operating system kernel controls which task has access to the CPU. That is, a task operating in a preemptive task scheduling environment may have its CPU access taken away by the operating system kernel. This is in contrast to the cooperative scheduling environment, where CPU access is controlled by the applications.

A feature of a preemptive task scheduling environment is that if a first task is unable to execute for any reason, e.g., if a page fault occurs, the kernel will suspend execution of the first task and a second task can begin execution. In contrast, if an application that is executing in a cooperative scheduling environment is similarly unable to run, no other application can execute because the current cooperative application cannot be forced to relinquish control of the CPU.

Another feature of preemptive task scheduling environments is that non-operating system tasks and applications are generally not executed in privileged mode or at a hardware interrupt level. In contrast, cooperative applications are frequently designed to execute in privileged mode or at a hardware interrupt level. In addition, cooperative applications are frequently designed based upon, and their proper operation relies upon, the interrupt semantics of the cooperative scheduling environment. Such interrupt semantics include a restriction that no application may execute while the interrupt completion routine executes, and that a single operation can disable interrupts for all applications. These cooperative interrupt semantics are not present in conventional preemptive task scheduling environments The above discussion demonstrates some of the difficulties involved in attempting to execute cooperative applications in a preemptive task scheduling environment. The Apple A/UX Unix operating system, developed and commercially distributed by Apple Computer, Inc., Cupertino, Calif., attempted to permit execution of cooperative applications in a preemptive task scheduling environment. However, the A/UX does not address the above mentioned compatibility problems. Specifically, the A/UX system did not preserve the time sequence, i.e., the ordering, in which the cooperative interrupts are delivered to different applications.

The A/UX system executes each interrupt handler via a Unix "signal" operation directed to the source application. Thereafter, the source application executes the interrupt completion routine. This design requires a complex application/task scheduler that requires frequent access to the operating system kernel, thereby decreasing the performance of the operating system.

When an interrupt signal is delivered to an application in the A/UX system, the kernel must prevent interrupts from executing in all other applications. Therefore, the delivery of a single interrupt affects the scheduling of all other applications. Rescheduling all of the applications further decreases the performance of the A/UX operating system.

Another compatibility problem arises when an application is written in a machine language of an instruction set architecture that differs from the machine language of an instruction set architecture of the preemptive task scheduling environment. The A/UX system does not address this problem.

What is needed is a system and method for: (1) executing applications written in a cooperative scheduling environment in a preemptive task scheduling environment; (2) ensuring that the time sequence for the delivery of interrupts is not altered in the preemptive task scheduling environment; (3) efficiently disabling all cooperative interrupts in response to a request from an application; (4) efficiently scheduling all cooperative interrupts; and (5) efficiently executing emulated instructions while preserving the integrity, i.e., the atomicity, of the emulated instructions.

SUMMARY OF THE INVENTION

The system and method of the present invention is an operating system that: executes applications written for execution in a cooperative scheduling environment in a preemptive task scheduling environment; ensures that the time sequence for the delivery of interrupts is not altered in the preemptive task scheduling environment; efficiently disables all cooperative interrupts in response to a request from an application; efficiently schedules all cooperative interrupts; and efficiently executes emulated instructions while preserving the integrity of the emulated instructions.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1:
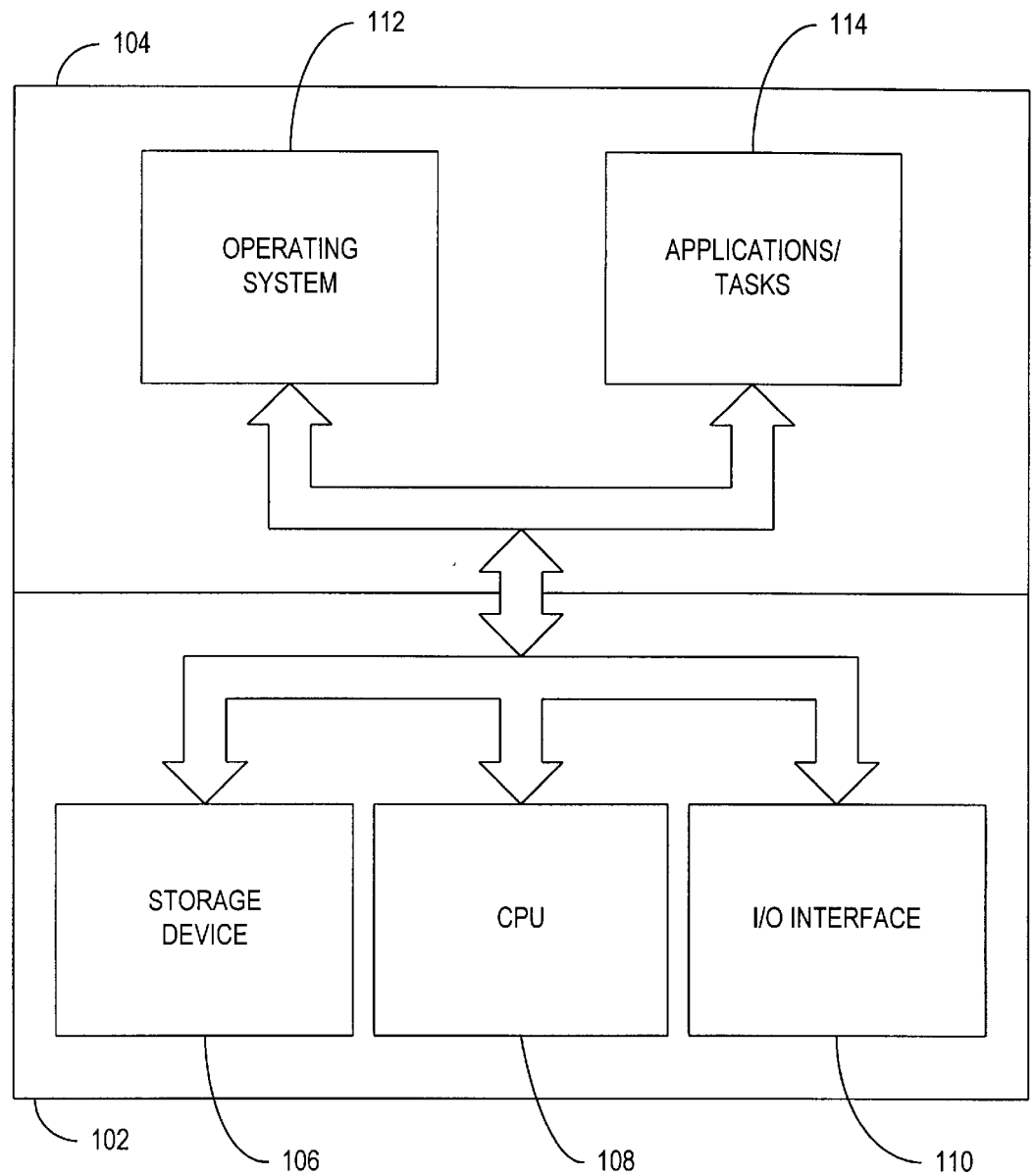
FIG. 1 is an illustration of a computer environment including a preferred embodiment of the present invention.

FIG. 1 illustrates a computer environment including a preferred embodiment of the present invention. The operating system resides in a computer platform 100, e.g., an Apple Power Macintosh model 6100/60, commercially available from Apple Computer, Inc., Cupertino, Calif. The computer platform 100 consists of hardware devices 102 and selected programs in memory 104 for operating the illustrated system. Preferably, the hardware devices 102 include conventional components such as a storage device 106, e.g., a disk drive, a central processing unit (CPU) 108, e.g., Motorola PowerPC 601, commercially available from Motorola, Inc., and an input/output (I/O) interface 110. The programs in memory 104 include an operating system 112 and applications and tasks 114. As described above, an application is a procedure that is designed to operate in a cooperative scheduling environment while a task is a procedure designed to operate in any other operating system environment.

Figure 2:
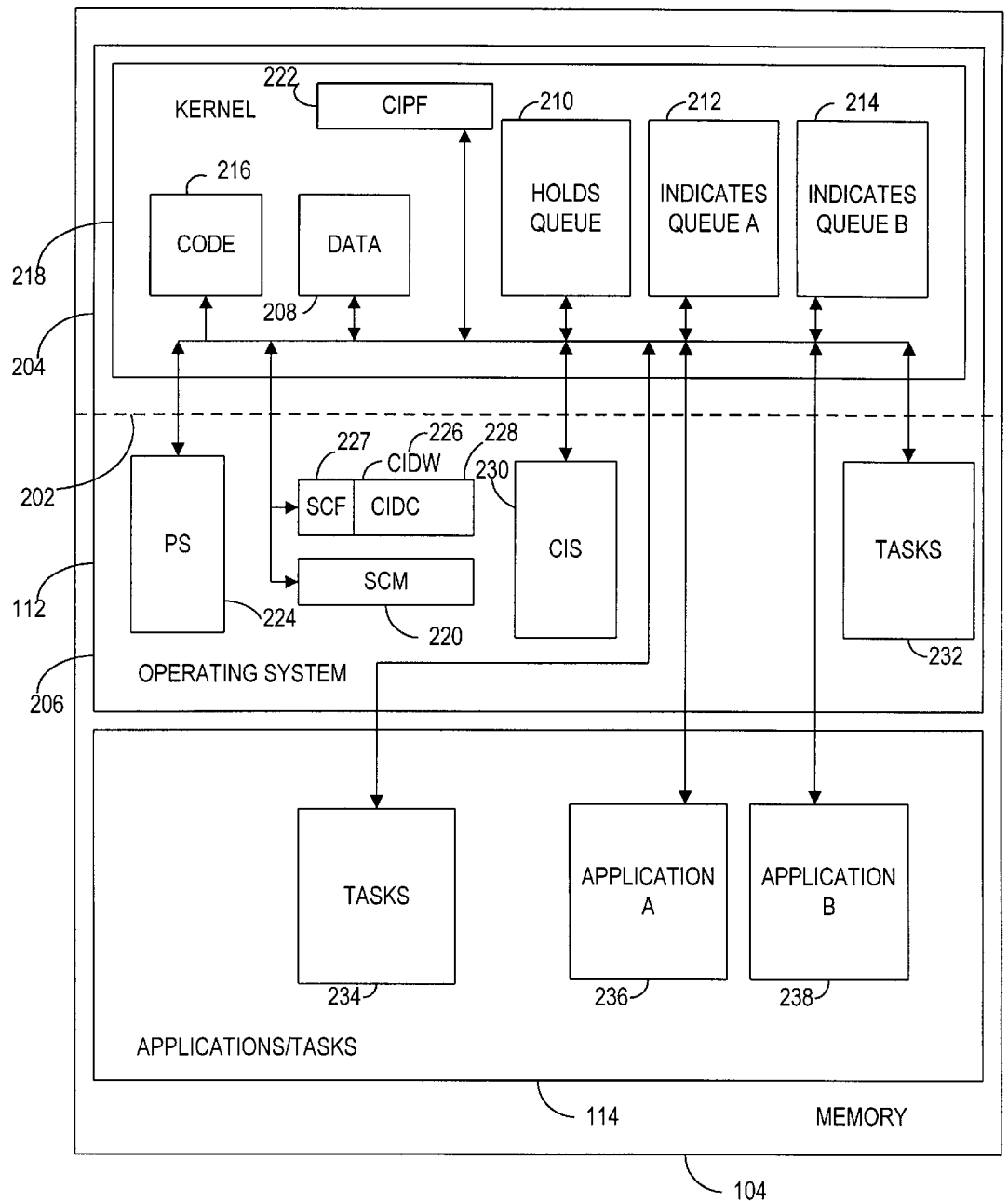
FIG. 2 is a more detailed illustration of the memory module of a preferred embodiment of the present invention.

FIG. 2 illustrates the memory module 104 of a preferred embodiment of the present invention. The operating system 102 of the preferred embodiment creates a preemptive task scheduling environment, as described above, and includes two portions. The privileged mode portion 204 is the portion of the operating system that operates in privileged mode. Data that is stored in privileged mode can only be written to by code 216 in the kernel or another device that is also in privileged mode. However, data that is stored in privileged mode can be read by any program or device. The operations performed by the operating system kernel 218, and hence the kernel code 216, are set forth below with reference to FIGS. 3–7. Data that is stored in privileged mode includes kernel data 208, the holds queue 210, the indicates queues 212, 214, and the cooperative interrupt pending flag (CIPF) 222. In FIG. 2, all elements above the dashed line 202 are in privileged mode while all elements below the dashed line 202 are in user mode. User mode data can be written to by a process that is in either user mode or in privileged mode.

The operating system kernel 218 defines and controls the scheduling environment of the computer system 100. As will be discussed in greater detail below, the kernel 218 of the present invention provides a preemptive scheduling environment and permits execution of applications that are designed to execute in a cooperative scheduling environment. A detailed discussion of the kernel 218 is now set forth.

The kernel 218 of the present invention preferably controls scheduling by implementing a queuing mechanism that includes a basic portion for use by tasks and a set of extensions that the kernel uses to schedule cooperative applications. The basic queuing mechanism includes three operations, create-a-kernel-queue, notify-a-kernel-queue, and wait-on-a-kernel-queue. The create-a-kernel-queue operation returns an identifier used to identify the kernel queue for use in the notify-a-kernel-queue operation and in the wait-on-a-kernel-queue operation. The notify-a-kernel-queue operation stores data into the kernel queue. This data is called a queue entry. The wait-on-a-kernel-queue operation retrieves a queue entry from the kernel queue, preferably using a first-in-first-out (FIFO) retrieval technique. The task that is executing the wait-on-a-kernel-queue operation receives the queue entry stored during a previous notify-a-kernel-queue-operation. If there are no queue entries in the queue, the kernel suspends the execution of the task that is executing the wait-on-a-kernel-queue operation, until a queue entry is stored in the kernel queue, not shown.

The kernel 218 of the present invention preferably adds two additional types of kernel queues. The first is an indicates queue 212, 214. Each indicates queue 212, 214 is associated with an application 236, 238 stored in memory 104. For example, indicates queue A 212 is associated with application A 236 and indicates queue B 214 is associated with application B 238. Each indicates queue 212, 214 stores data for its associated application and is utilized by the kernel 218 and the process server 224, discussed below, to execute the cooperative applications. The kernel 218 tracks the identity of the last application that successfully retrieved a queue entry from its associated indicates queue 212, 214. This application is called the current cooperative application (CCA).

The second additional type of kernel queue is the holds queue 210. The holds queue 210 stores data representing the memory address of the completion routine for a cooperative interrupt. The address of each completion routine is stored in the holds queue before the completion routine is executed by the cooperative interrupt server (CIS) 230, discussed below. The functions performed by the indicates queues 212, 214 and the holds queue 210 are discussed in greater detail below with reference to FIGS. 3–7.

The cooperative interrupt pending flag (CIPF) 222 is a word of memory that is set by the kernel 218 when at least one cooperative interrupt is pending. The kernel 218 resets the CIPF 222 when no cooperative interrupts are pending. The CIPF 222 is in the privileged mode portion 204 of the operating system. Therefore, the value of the CIPF is readable by all applications and tasks, but can only be written to by the kernel 218. The CIPF 222 is discussed in greater detail below with reference to FIGS. 3–7.

The portion 206 of the operating system operating in user mode contains system code. Some system code executes as a result of an explicit application call, e.g., a WaitNextEvent call. Other system code executes independently of any application. This system code is called a system task. Preferably, the operating system includes at least two system tasks, the process server (PS) 224 and the cooperative interrupt server (CIS) 230. Another example of a system task 232 is a system registry.

The PS 224 is preferably a software module that performs the following procedure. The PS 224, in conjunction with the kernel 218, selects the current cooperative application (CCA) and suspends the operation of all other cooperative applications. The PS 224 selects the CCA by initially storing application information in the indicates queue 212, 214 associated with one of the applications 236, 238. For example, in order for the PS 224 to select application B 238 as the CCA, the PS 224 stores information in indicates queue B 214. The information stored in indicates queue B 214 pertains to the process that application B 238 is to perform. The PS 224 ensures that only one application, the CCA, has access to the CPU 108 by storing information in only one indicates queue. After the PS 224 stores information in indicates queue B 214, the associated application, i.e., application B 238, becomes the CCA.

The CIS 230 executes in conjunction with the holds queue 210 to execute the completion routine (CR) of an asynchronous operation, discussed above. The CIS 230 is suspended if the holds queue 210 is empty or if the cooperative interrupt disable count (CIDC) 228 is not equal to zero and a CR is not executing. Additional operations performed by the CIS 230 are discussed below with reference to FIGS. 3–7.

The CIDC 228 is globally accessible to the kernel 218, to all applications 236, 238, and to all tasks. Preferably, the CIDC 228 is part of the cooperative interrupt disable word (CIDW) 226. The CIDW 226 includes the CIDC 228 and a special context flag (SCF) 227 that is preferably a one bit flag. The SCF 227 is a bit that represents whether the CCA is operating in a special context mode. The SCF 227 and the special context mode are discussed in greater detail below. The kernel 218 initially resets the value of the CIDC to zero. While the tasks and applications are executing, if the value of the CIDC 228 is zero, the operating system will deliver cooperative interrupts. That is, cooperative interrupts are enabled, i.e., the CIS 230 can process the CR whose address is in the holds queue 210. If the value of the CIDC 228 is positive, then cooperative interrupt delivery is disabled, i.e., queue entries can be placed into the holds queue 210, but the queue entries cannot be retrieved by the CIS 230. The CIDC 228 provides a counting mechanism that permits each application 236, 238 to disable all cooperative interrupts. The CIDC 228 counts the number of disable commands and the number of enable commands generated by the applications 236, 238. Cooperative interrupts are enabled only when the number of enable commands is equal to the number of disable commands, i.e., when CIDC is equal to zero.

The special context mask (SCM) 220 is data stored in the memory portion 104, e.g., in the operating system 112. The SCM 220 is in the user mode portion 206 of the operating system 112. The SCM 220 is described in greater detail below.

The applications/tasks portion 114 of memory 104 preferably includes a combination of cooperative applications 236, 238 and tasks 234. Examples of tasks 234 include a file server and a database server. The applications 236, 238 and the tasks 234 operate in the user mode, as described above.

FIGS. 1 and 2 illustrate the preferred embodiment of the system of the present invention. FIGS. 3–7 illustrate the preferred embodiment of the method of the present invention. As discussed above, the present invention is an operating system having a preemptive task scheduling environment that includes a system and method for executing applications designed to operate in a cooperative scheduling environment. In order to properly execute the cooperative applications 236, 238 in a preemptive task scheduling environment, the operating system 112 ensures that all applications operate cooperatively by ensuring that: (1) only one application can be executed at a time, this application is called the current cooperative application (CCA); (2) all other applications are suspended until after the CCA explicitly relinquishes control of the CPU; (3) the completion routines (CR) associated with an asynchronous event initiated by an application can interrupt the execution of the CCA; (4) no application can execute while the CR is executing; (5) a single operation can disable all cooperative interrupts; and (6) the order of the cooperative interrupts is unchanged when compared with the order of the cooperative interrupts when the applications are executed in a cooperative scheduling environment.

Figure 3A:
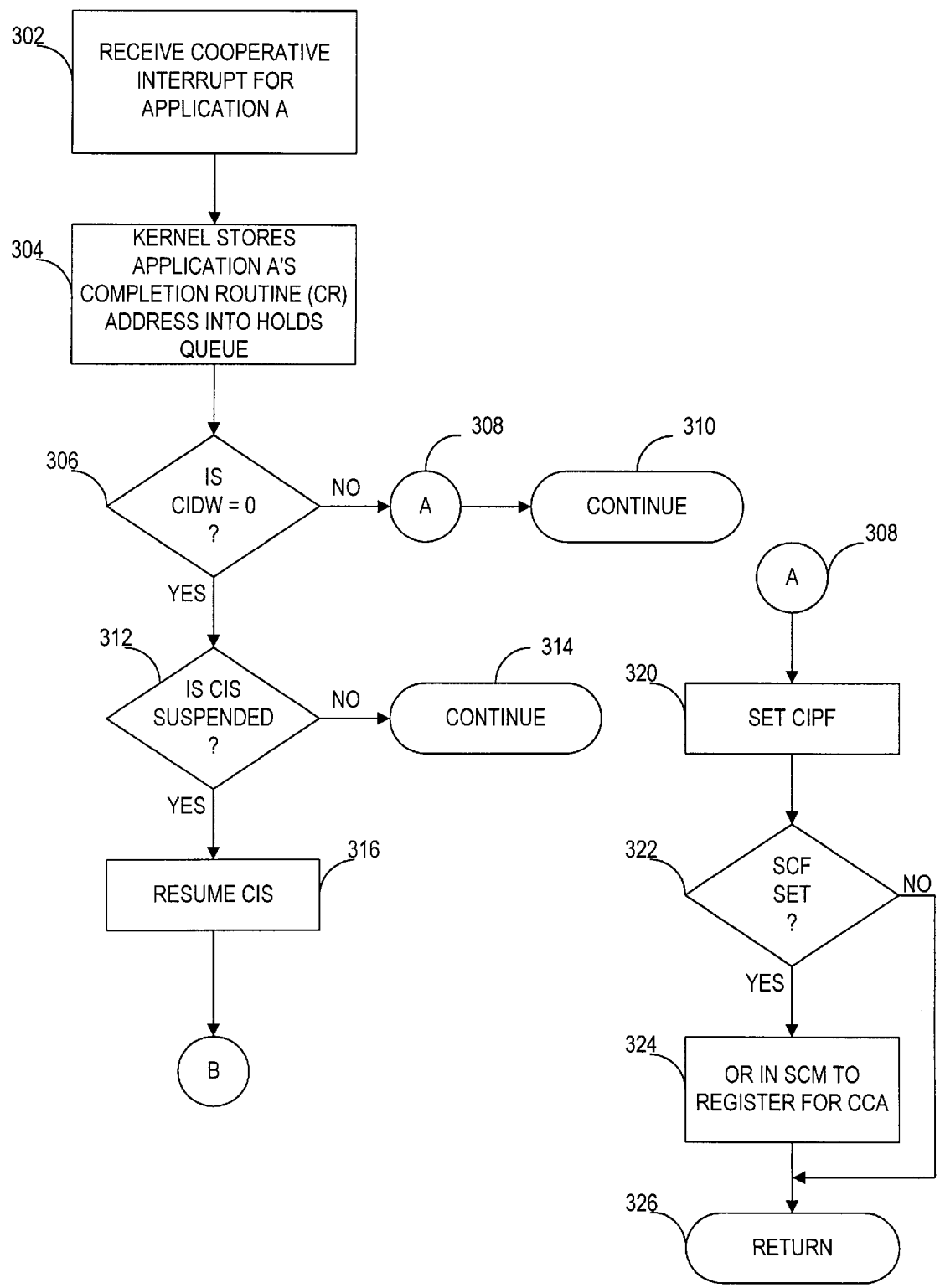
FIGS. 3A–3B is a flow diagram describing the method for delivering a cooperative interrupt to an application and executing a cooperative interrupt according to a preferred embodiment of the present invention.

FIG. 3 is a flow diagram describing the method for delivering and executing a cooperative interrupt to an application according to a preferred embodiment of the present invention. While application A 236 is the CCA it initiates an asynchronous operation. Application A relinquishes control of the CPU 108 and a new application has "exclusive" access to the CPU. This application is, therefore, the new CCA. This CCA has "exclusive" access to the CPU only with respect to other cooperative applications. That is, non-cooperative procedures, e.g., the tasks 234, will operate preemptively and can interrupt the CCA, even if the cooperative interrupts are disabled. For example, a task 234 can interrupt the CCA whenever the kernel 218 determines that the task is not suspended and the task execution priority exceeds the CCA execution priority.

The kernel 218 receives 302 a cooperative interrupt for application A 236. The kernel stores 304 the address of the completion routine (CR) in the holds queue 210. The completion routine is associated with the asynchronous operation implemented by application A while application A was the CCA. The kernel 218 checks 306 the value of CIDW 226. When the CIDW 226 is equal to zero, the cooperative interrupts are enabled and the SCF 227 indicates that the CCA is not operating in a special context mode, described below. In the current example, the CCA is not operating in a special context mode, therefore, for this example, the SCF 227 is zero.

If the CIDW 226 is not equal to zero, i.e., all cooperative interrupts are disabled, the kernel 218 performs the steps set forth in subroutine "A" 308. In subroutine A 308, the kernel 218 sets 320 the CIPF 222. When the CIPF 222 is set, e.g., to a non-zero value, the CIPF 222 represents that a cooperative interrupt is pending. Since the SCF 227 is equal to zero, i.e., it is not set 322, subroutine A returns 326 and the operating system continues 310 executing the CCA, the task, or the CR that was executing when the kernel received the cooperative interrupt in step 302.

If it is determined 306 that the CIDW 226 is equal to zero, the kernel 218 determines 312 if the CIS 230 is currently suspended. The CIS 230 can be suspended if no CR is executing and: (1) the cooperative interrupts are disabled, i.e., CIDW 226 is not equal to zero; or (2) the holds queue 210 is empty. In step 306 the kernel 218 checked to see if the cooperative interrupts were disabled. Therefore, step 312 occurs only if the cooperative interrupts are enabled. Accordingly, if the kernel determines that the CIS 230 is suspended in step 312 then, before the execution of step 304, all pending CR's were executed and the holds queue 210 was empty. If the CIS 230 is not suspended then the CIS is executing a CR, or a higher priority task is executing. Therefore, the kernel 218 permits the operating system 112 to continue executing as described above with reference to step 310. If the CIS 230 is suspended, the kernel 218 resumes 316, i.e., "wakes up", the CIS 230. The kernel 218 removes 330 the queue entry, i.e., the address of the CR, from the holds queue 210 and sends it to the CIS 230 and then suspends 332 the CCA. Since only one application can be unsuspended at a time, i.e., the CCA, suspending the CCA effectively suspends all applications.

Thereafter, the CIS 230 executes 334 the CR. It is important to note that the CIS 230 controls the execution of the CR as opposed to the application that initiated the asynchronous operation. This is important because it preserves the global ordering of the CR. That is, since all CR are processed by a single task, i.e., the CIS 230, the CIS 230 serializes the CR in the holds queue 210 thereby ensuring that the CR's are processed in the order in which the asynchronous operations are completed, regardless of which application initiated the asynchronous operation. In contrast, in conventional systems, e.g., the A/UX system described above, the ordering of the CR's are preserved only with respect to each individual application. That is, the CR ordering for all of the applications are not preserved. As a result, in conventional systems, a second CR may execute before a first CR even though the asynchronous operation associated with the first CR completed first.

Thereafter, the CIS 230 asks the kernel 218 to determine 336 if any more cooperative interrupt information (CII) is stored in the holds queue 210. CII may be stored in the holds queue 210 if multiple cooperative interrupts were pending on the holds queue 210 during step 330 or if a new cooperative interrupt was placed 304 on the holds queue 210 while the CIS 230 was executing a previous CR. If more CII is stored in the holds queue 304, the kernel 218 determines 344 if the cooperative interrupts are disabled, i.e., if CIDW is not equal to zero. The cooperative interrupts could be disabled by the previous CR. If the cooperative interrupts are disabled, the kernel 218 executes steps 320–326 in subroutine A 308, described above. Thereafter, the kernel 218 resumes 338 the CCA, suspends 340 the CIS 230, and continues executing in the manner described above with reference to step 310. If the kernel 218 determines 344 that the cooperative interrupts are enabled, the procedure repeats beginning from step 330. After all cooperative interrupts have been serviced, the holds queue 210 is empty. Thereafter, the kernel 318 resumes 338 the CCA, suspends 340 the CIS 230, and continues executing in the manner described above with reference to step 310.

Figure 4:
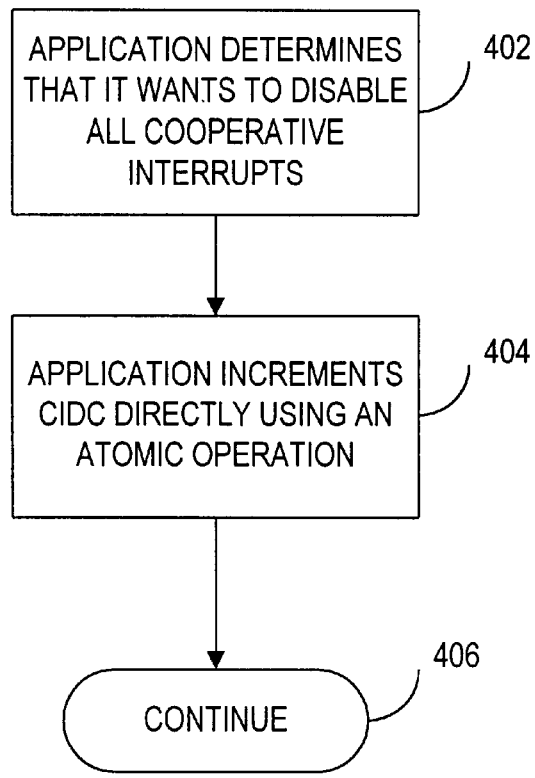
FIG. 4 is a flow diagram describing the method for disabling all cooperative interrupts according to a preferred embodiment of the present invention.

As stated above, any application, task, or CR can disable all cooperative interrupts. In conventional systems, the cooperative interrupt disable (and enable) command requires access to the kernel 218. Unfortunately, kernel 218 access is expensive in terms of system performance. The present invention alleviates this problem. FIG. 4 is a flow diagram describing the method for disabling all cooperative interrupts. A CCA, task, or CR, i.e., the current procedure, determines 402 that it needs to disable all cooperative interrupts. The current procedure increments 404 the CIDC directly, i.e., without accessing the kernel 218, using an atomic operation. Atomic operations, e.g., a compare and swap operation, are preferably provided by the CPU 108. Atomic operations are generally used to synchronize access to a single word of data shared between multiple tasks. In contrast, the present invention uses the atomic operation to synchronize operations between the kernel 218 and a task or an application. After incrementing 404 the CIDC 228, the kernel continues operating as described above with reference to step 310.

Figure 5:
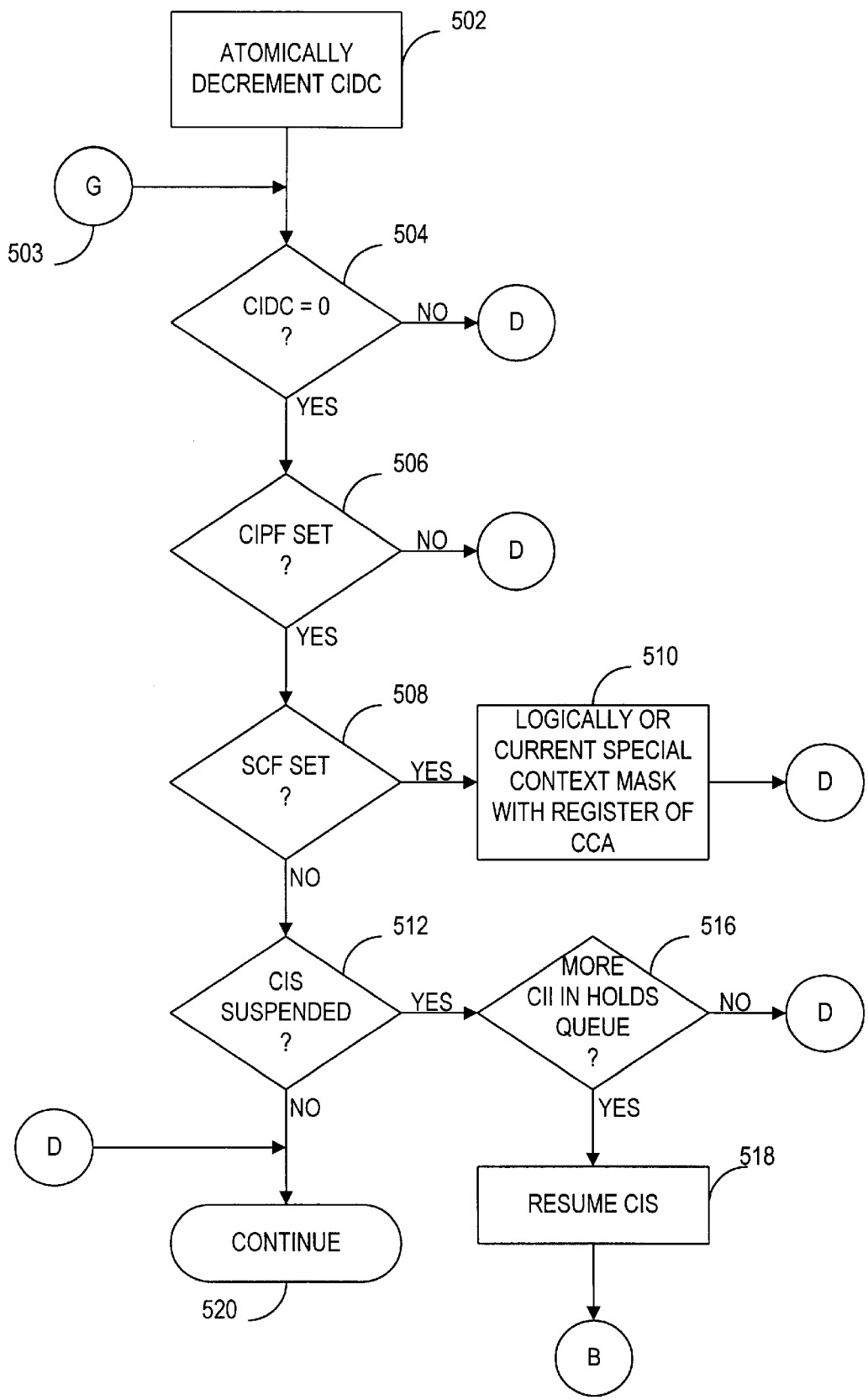
FIG. 5 is a flow diagram describing the method for enabling cooperative interrupts according to a preferred embodiment of the present invention.

Any application, task, or CR can decrement the CIDC 228. FIG. 5 is a flow diagram describing the method for enabling cooperative interrupts. In conventional systems, as described above with reference to FIG. 4, the cooperative interrupt enable command requires access to the kernel 218. In the present invention, the CCA, task, or CR, i.e., the current procedure, atomically decrements 502 the CIDC without accessing the kernel 218. The current procedure determines 504 if the cooperative interrupts are enabled, i.e., if the CIDC 228 is equal to zero. If the cooperative interrupts are disabled, the operating system 112 continues 520 executing as described above with reference to step 310. If the cooperative interrupts are enabled, the current procedure checks 506 the CIPF 222 to determine if any cooperative interrupts are pending. If no cooperative interrupts are pending, the operating system 112 continues 520 executing as described above with reference to step 310. If a cooperative interrupt is pending, the current procedure requests the kernel 218 to deliver all pending cooperative interrupts. The kernel 218 determines 508 if the CCA is operating in a special context mode by checking the SCF 227. As discussed above, in this example the SCF 227 is not set.

Figure 3B:
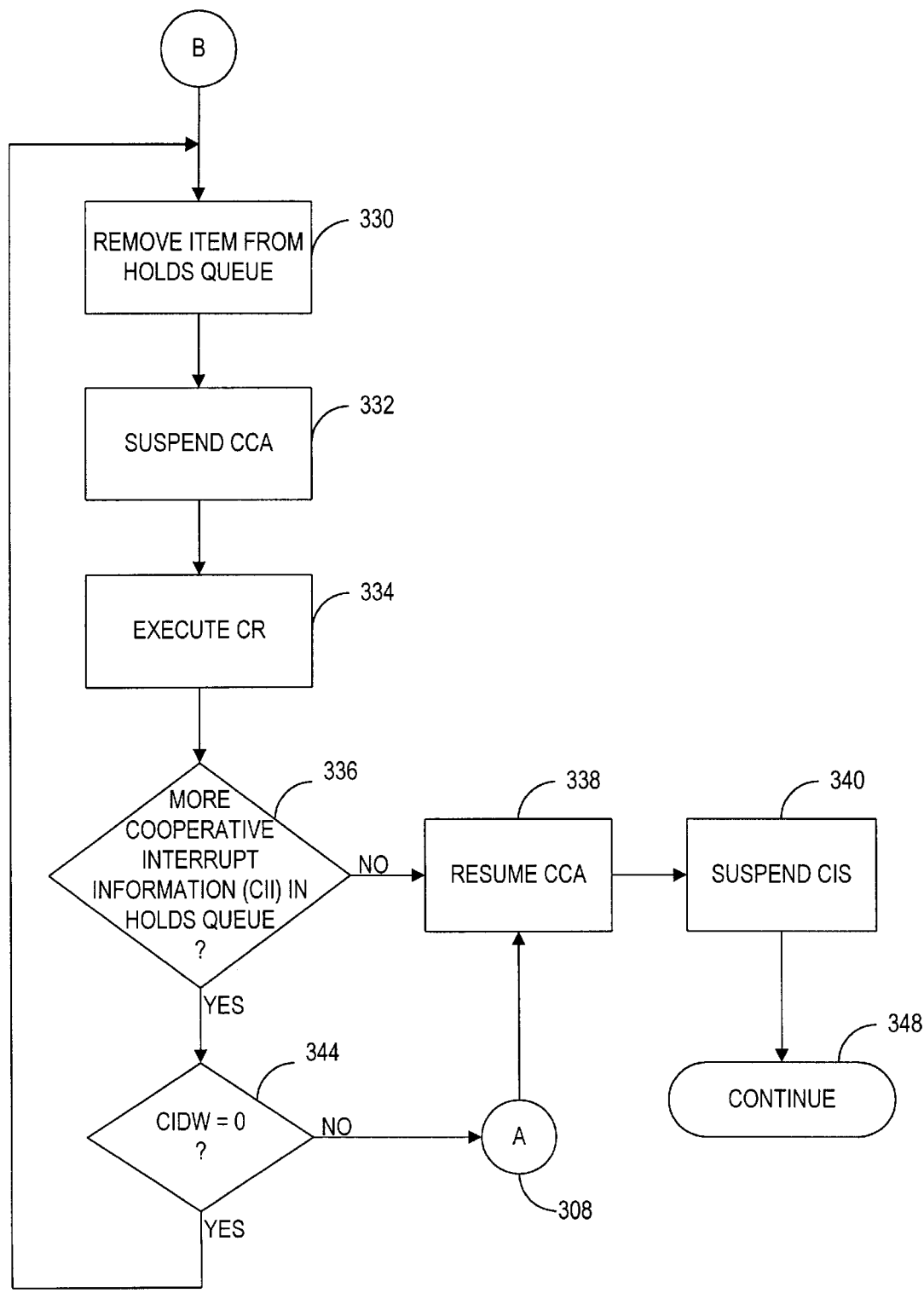

The kernel 218 then determines 512 whether the CIS 230 is suspended 512. If the CIS 230 is not suspended, the operating system continues 520 executing as described above with reference to step 310. If the CIS 230 is suspended the kernel 218 determines 516 if any CII is stored in the holds queue 210. If the holds queue 210 is empty, the operating system continues 520 execution as describe above with reference to step 310. If the holds queue 210 does contain CII information, the kernel 218 resumes the CIS 230 and steps 330–348, shown in FIG. 3B, are executed in the manner described above.

The method for executing cooperative applications designed to operate in a cooperative scheduling environment when the cooperative applications are not operating in a special context mode is described above. The method for executing cooperative applications operating in a special context mode is set forth below.

The above described method involves the situation where both the applications 236, 238 and the tasks 234 are designed using the same instruction set architecture. Frequently, however, one or more applications may use a different instruction set architecture, i.e., an old instruction set, than the instruction set utilized by the operating system 112 and the other applications or the tasks. Applications using the old instruction set are executed using an old instruction set emulator, hereafter referred to as the "emulator". The emulator executes CPU instructions from the old instruction set architecture environment (the old environment), using the native CPU instructions from the new instruction set architecture environment (the new environment). When the operating system is emulating an application designed using the old instruction set, the operating system is operating in the special context mode.

In order to emulate one instruction from the old environment, the new environment may require several native CPU instructions. In order to maintain the integrity, i.e., the atomicity, of the cooperative applications in the new environment, cooperative interrupts can only occur at an old instruction boundary of the native CPU instructions. That is, if the new environment requires three native CPU instructions to emulate a single instruction from the old environment, the operating system 112 must ensure that no cooperative interrupts occur until after all three native CPU instructions are executed.

When the CPU 108 executes applications designed in the old environment (old applications), both emulated and native CPU instructions are executed. The present invention defines a special context mechanism that provides the necessary speed when emulating instructions and when switching between emulated and native CPU instruction execution. The speed is provided by limiting requests to the kernel 218. Specifically, no extra memory reference is required between execution of emulated instructions. In addition, the kernel 218 is not accessed: (1) between execution of emulated instructions, (2) when switching from executing native CPU instructions to emulated instructions, and (3) when switching from executing emulated instructions to native CPU instructions unless cooperative interrupts are pending and enabled.

As discussed above, when emulating an old application, the operating system 112 is in a special context mode. The operating system 112 enforces the requirements of the special context mode, set forth above, using a special context mask (SCM) 220 and a special context flag (SCF) 227. The SCM 220 is preferably a data word located in the user portion of memory 104. Preferably, the SCM 220 is set by the emulator (CCA) as part of an enter-special-context operation. The SCF 227 is preferably a single bit that is stored in upper bit of the same word, CIDW 226, as the CIDC 228. Storing the SCF 227 within the same word as the CIDC 228 permits the two items to be manipulated simultaneously using an atomic operation, discussed above. Storing the SCF 227 in the upper bit of the CIDW 226 permits the CIDC 228 to be incremented and decremented with normal arithmetic operations.

Figure 6:
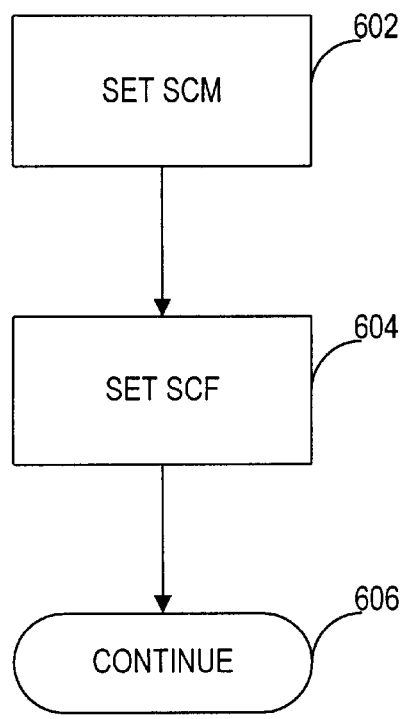
FIG. 6 is a flow diagram describing the method for entering a special context mode according to a preferred embodiment of the present invention.

When the emulator begins execution of emulated instructions the emulator, which is the CCA, performs an enter-special-context operation. The enter-special-context operation is illustrated in FIG. 6. The emulator performs the enter-special-context operation by setting 602 the SCM 222 and by setting 604 the SCF 227. When the SCF 227 is set, the cooperative interrupts are disabled. This is apparent from step 306 and step 344 in FIG. 3. In both of these steps the kernel 218 determines if the entire word CIDW 226 is equal to zero. If the SCF 227 is non-zero then CIDW 226 is not equal to zero. When sub-routine A 308 is executing, the kernel 218 determines 322 if the SCF 227 is set. If the SCF is set, then instead of delivering the cooperative interrupt, as described above, the kernel 218 modifies a data register inside the emulator (CCA) by performing a logical OR operation between the SCM 220 and the internal register of the emulator.

The emulator checks the affected bit in the internal register only at emulated instruction boundaries, although the emulator may not check the register at every instruction boundary. Since the affected bit is in an internal register it is extremely efficient for the emulator to check the status of the bit.

Figure 7:
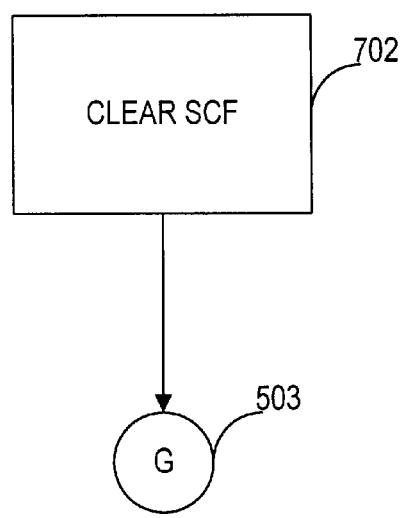
FIG. 7 is a flow diagram describing the method for exiting a special context mode according to a preferred embodiment of the present invention.

When the emulator of the present invention detects that the bit is set, the emulator executes an exit-special-context operation. The exit-special-context operation is illustrated in FIG. 7. The emulator clears 702 the SCF 227 and the internal register bit in the emulator. The emulator then proceeds to point "G" 503 in FIG. 5. After all cooperative interrupts have been serviced, as described above with reference to FIGS. 3–5, the emulator continues by executing an enter-special-context operation and resumes executing emulated instructions.

In the situation where the SCF 227 is set and an application decrements the CIDC, the process performed by the present invention is set forth in FIG. 5. When the kernel 218 determines 508 that the SCF 227 is set, the kernel 218 does not immediately service the cooperative interrupt. Instead, the kernel 218 modifies the internal register of the emulator, CCA, by performing a logical OR operation with the SCM 220 and the internal register, and stores the result in the internal register as described above with reference to step 324.

While the invention has been particularly shown and described with reference to a preferred embodiment and several alternate embodiments thereof, it will be understood by persons skilled in the relevant art that various change in form and details can be made therein without departing from the spirit and scope of the invention.

What is claimed is:

1. In a computer-based system having a processor, a controller, a memory module, and a preemptive operating system that does not support cooperative scheduling, a method for executing within the preemptive operating system, a first application designed to operate on a cooperative scheduling operating system, comprising the steps of:

receiving a cooperative interrupt associated with the first application;

storing an address of a completion routine, associated with the first application, in a queue allocated in the memory module, said completion routine including an interrupt handling procedure for servicing said cooperative interrupt;

determining if said completion routine is permitted to execute; and executing said completion routine under control of a cooperative interrupt server responsive to said queue, if said completion routine is permitted to execute.

2. The method of claim 1, further comprising the step of:

suspending execution of a second application that is designed to operate on the cooperative scheduling operating system, if said completion routine is permitted to execute.

3. The method of claim 1, further comprising the step of:

disabling said completion routine by setting one or more disable bits in the memory module using an atomic operation that does not access the controller.

4. The method of claim 3, wherein said step of determining if said completion routine is permitted to execute includes the steps of:

determining if an emulator is executing an emulated instruction; and determining if said emulator is executing an instruction at a boundary of said emulated instruction, if said emulator is executing said emulated instruction.

5. The method of claim 4, wherein the step of determining if said completion routine is permitted to execute includes the step of:

setting one or more special context bits in said emulator.

6. The method of claim 5, wherein the step of setting one or more special context bits includes the steps of:

storing a value in a special context mask if said emulator is executing an emulated instruction;

performing a logical OR operation between said special context mask and said special context bits; and storing the result of the logical OR operation in said special context bits.

7. The method of claim 1, further comprising the step of:

interrupting the execution of said first application to execute a second application designed to operate on an operating system supporting preemptive task scheduling.

8. The method of claim 1, further comprising the steps of:

receiving a second cooperative interrupt associated with a second application;

storing the address of a second completion routine, associated with a third application designed to operate in the cooperative scheduling environment, in the queue allocated in the memory module, said second completion routine including a procedure for servicing said second cooperative interrupt;

determining if said second completion routine is permitted to execute, if said first completion routine is not executing;

setting a cooperative interrupt pending indicator if said first completion routine is executing; and executing said second completion routine using said cooperative interrupt server responsive to the queue if said second routine is permitted to execute, said cooperative interrupt server ensuring that all cooperative interrupts are responded to in a same response sequence of the cooperative scheduling operating system supporting the cooperative interrupts.

9. The method of claim 8, further comprising the step of:

suspending execution of said second application if said second completion routine is permitted to execute.

10. The method of claim 1, further comprising the step of:

suspending all cooperative applications except for a current cooperative application to ensure that the only cooperative application that can execute is said current cooperative application.

11. A computer-based preemptive operating system, having a processor, for executing a first application and a second application designed to operate on a cooperative scheduling operating system using cooperative interrupts, the system comprising:

a first queue, for storing information related to the operation of the first application;

a process server, disposed to communicate with said first queue, for ensuring that only one of the first application and the second application has access to the processor in accordance with a cooperative scheduling environment;

a completion routine, associated with the first application, for servicing a first cooperative interrupt associated with the first application;

a second queue, for storing the address of said completion routine;

a cooperative interrupt server, disposed to communicate with said second queue, for receiving the address of each completion routine in response to the corresponding cooperative interrupt associated with the completion routine being received, for servicing each cooperative interrupt, and for ensuring that each cooperative interrupt is serviced in a same sequence that the cooperative interrupts are serviced in the cooperative scheduling operating system; and a controller, coupled to said first queue, said process server, and said cooperative interrupt server, for controlling access to said first queue and said second queue, and for providing a preemptive scheduling environment.

12. The system of claim 11, further comprising:

a disable mechanism, disposed to receive signals from one of the first application, the second application, and the completion routine, for preventing the servicing of cooperative interrupts by said cooperative interrupt server, without accessing said controller.

13. The system of claim 12, wherein said disable mechanism further comprises:

an emulated instruction indicator, disposed to receive signals from said controller, for storing information indicating that an emulated instruction is executing, said disable mechanism preventing the servicing of the cooperative interrupts by said cooperative interrupt server when said emulated instruction indicator is set.

14. The system of claim 13, further comprising:

a memory location, located within the first application, for notifying the second application that a cooperative interrupt is pending;

wherein said controller modifies said memory location when a cooperative interrupt is pending and said emulated instruction indicator is set.

15. In a computer-based system having a processor, a controller, a memory module, and a preemptive operating system that does not support cooperative scheduling, a method for executing in the preemptive operating system, a plurality of applications designed to operate on a cooperative scheduling operating system, comprising the steps of:

asynchronously receiving a plurality of cooperative interrupts, each cooperative interrupt associated with one of the plurality of applications, each cooperative interrupt further associated with a completion routine for servicing the cooperative interrupt;

determining whether at least one completion routine is permitted to execute; and synchronously executing each of the plurality of cooperative interrupts under control of a task scheduler according to an order in which the cooperative interrupts were asynchronously received.

* * * * *